United States Patent [19]

Eigenmann

[11] 3,964,821
[45] June 22, 1976

[54] REFLEX REFLECTING SYSTEM FOR ROAD SURFACE MARKING

[76] Inventor: Ludwig Eigenmann, Vacallo, Canton Ticino, Switzerland

[22] Filed: Dec. 27, 1973

[21] Appl. No.: 428,909

[30] Foreign Application Priority Data
Dec. 28, 1972 Italy .................................. 33710/72

[52] U.S. Cl. .................................... 350/105; 404/9
[51] Int. Cl.² ......................................... G02B 5/12
[58] Field of Search ............................ 350/97–109; 404/9–16

[56] References Cited
UNITED STATES PATENTS
| | | | |
|---|---|---|---|
| 3,274,888 | 9/1966 | Vanstrum et al. | 350/105 |
| 3,556,637 | 1/1971 | Palmquist | 350/105 |
| 3,781,083 | 12/1973 | Eigenmann | 350/105 |

*Primary Examiner*—R. V. Rolinec
*Assistant Examiner*—Michael J. Tokar
*Attorney, Agent, or Firm*—Michael J. Striker

[57] ABSTRACT

The disclosure describes new and improved reflex reflecting systems of the type comprising a spherical transparent lens having reflex reflective means arranged about it and secured relative thereto and optically associated therewith by means of a transparent binder material, the system being designed to be embedded in part in the surface layer of a traffic regulating sign formed on a traffic carrying surface of a road with the protecting portion of the lens being uncovered and exposed to impinging light, the said lens and the said binder being made of a transparent material the index of refraction of which is from 1.3 to 1.7, preferably about 1.5, and the total transparency parameter of the system, for light impinging under an incidence angle of 80°, being greater than 0.2.

14 Claims, 9 Drawing Figures

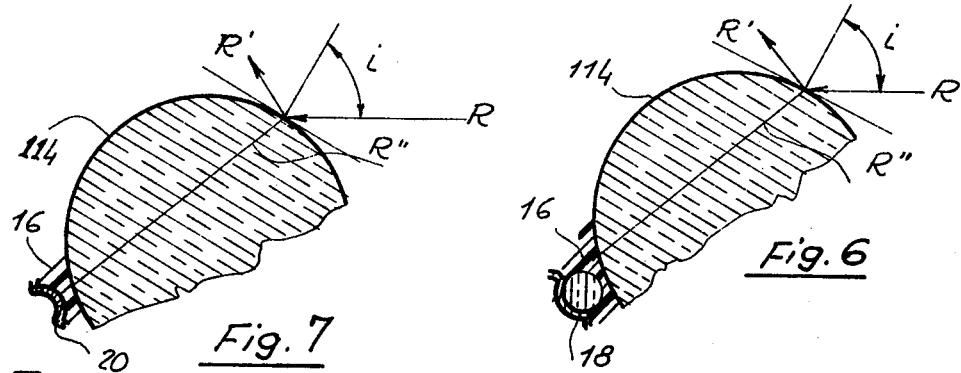
*Fig. 7* *Fig. 6*
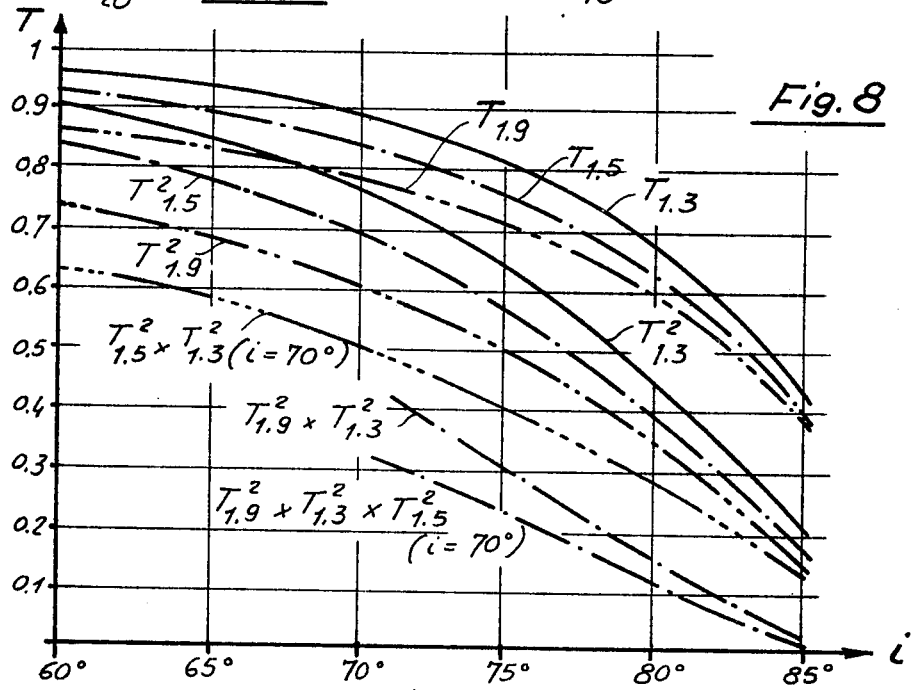
*Fig. 8*
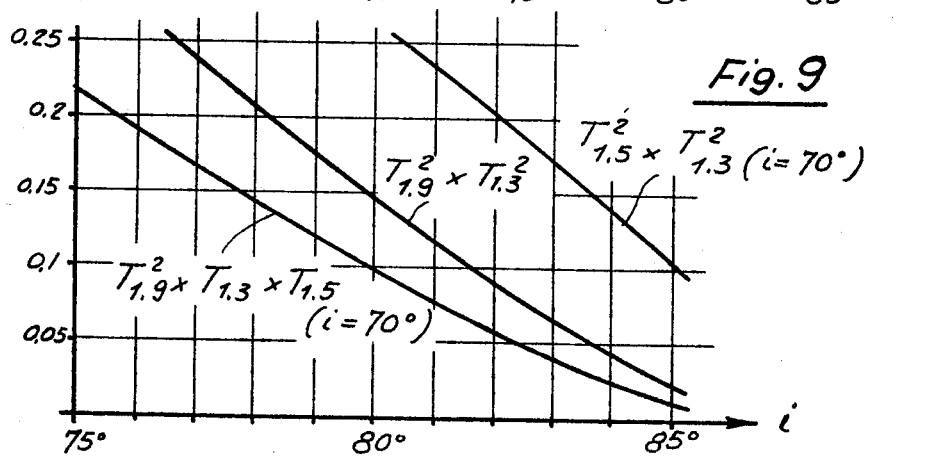
*Fig. 9*

REFLEX REFLECTING SYSTEM FOR ROAD SURFACE MARKING

BACKGROUND OF THE INVENTION a. The Field of the Invention

This invention relates to the art of road marking and more particularly of producing light reflecting and collimating systems designed for improving nighttime visibility of traffic regulating signs and markers such as traffic lane dividing lines and other signs formed on traffic carrying road surfaces. More specifically, this invention is concerned with light reflecting aggregates or systems adapted to be at least partially embedded in the road surface-forming and sign-forming material and comprising a combination and arrangement of spherical and part-spherical transparent, reflective and refractive elements cooperatively correlated so that the light rays emitted by a vehicle headlamps, in a direction forming a very small angle with the generally planar surface of the road, and impinging on an exposed part-spherical portion of the system, are so refracted and reflected within the system that at least some such rays are returned towards the source of light and made visible to the vehicle's driver.

b. The Prior Art

The art to which this invention appertains is a well worked one and a wide technical and patent literature exists and deals with the various aspects of the problems involved in securing an effective nighttime visibility of traffic regulating signs applied on or formed at the road surface, when the sole or principal source of light is provided by the vehicle's headlamps, that is when the signs are illuminated at a distance by "grazing" light, that consists of light rays forming the above indicated very small angle with the road surface, of one or a very few degrees. One mode for improving such nighttime visibility of traffic aids on traffic carrying surfaces has been for example described in my prior U.S. Pat. No. 3,746,425.

Other modes for reflecting a ray of light back along its own path of incidence have been proposed heretofore. For example, in the U.S. Pat. No. 3,311,441 there has been proposed a "collinear reflector" obtained by locating a short focus lens, which may be in the forms of a sphere of relatively large diameter, in front of a reflex reflecting surface made up of a plurality of glass beads having a relatively small diameter partially embedded or in contact with a reflecting surface. The reflector described and shown therein is so constructed that a light beam including rays parallel to or forming a relatively small angle with the axis of the reflex reflecting surface can be effectively reflected back.

A "reflex" light reflector (the term "reflex" reflector having been made use of to distinguish it from mirrors which cause specular reflection, and from diffusing surfaces which do not ensure selective return of the light in the direction of incidence), which also includes the above arrangement of spherical short focus lenses and beads including reflex reflecting means, has been described in the U.S. Pat. No. 2,294,930. The behaviour of such reflex reflecting systems has been extensively analyzed in said latter patent literature, where there has been described and illustrated how the "brilliancy" (this term signifies the intrinsic efficiency of reflex reflectivity) drops as the angle of incidence (i) increases, and how it is nearly zero for angles (i) of 40° or higher.

While such and other reflex reflecting systems might be assumed to be generally efficient, they have been proven as not successful when partially embedded in a nearly planar and horizontal surface, such as that of a sign formed on or applied to a traffic carrying surface, while they are efficient when so associated with sharply bulging markers that the exposed portions of their lenses are facing the source of light, that is are impinged by light rays under a small angle of incidence.

As a consequence of the above summary (the applicant acknowledges that only a part of the wide literature has been indicated hereinabove) it is evident that the current technology of reflex reflecting systems and structures fails to provide systems of the above character which can efficiently provide a desirable brilliancy under grazing light, when the part-spherical exposed portions of their lenses bulges up, for a distance corresponding to a portion of their radii only, from a nearly planar and horizontal non-transparent surface, and when impinged at their top portions by grazing light. In other words, the prior art systems cannot be efficiently made use of for imparting favorable nighttime visibility to traffic regulating signs which form part of a traffic carrying surface.

It is therefore the object of this invention to provide a new and improved reflex-reflecting system of the character referred to above, adapted to be principally but not exclusively made use of for imparting a substantial and uniform brilliancy and consequently visibility, to the surface of traffic regulating signs formed on a traffic carrying surface, by embedding a plurality of such systems in the sign forming compound which spacing by scattering.

BRIEF SUMMARY OF THE INVENTION

The principles of the invention and the best modes for taking advantage thereof will be discussed below and set forth in the appended claims. The improved system of the invention, however, as considered in its broad aspect, comprises a spherical lens adapted to have an exposed part spherical portion and formed of a transparent material the index of refraction of which is between 1.7 and 1.3, and preferably about 1.5, said spherical lens being associated, where not exposed with impinging light, to a transparent binder the index of refraction of which is near or equal to that of the lens, and with reflective collimating means, the new system being characterized by the fact that its total transparency parameter (defined hereinbelow), when its said exposed portion is impinged by light under an incidence angle of about 80°, is not less than 0.2.

Other objects and advantages of the invention will be apparent from the following description, taken in conjunction with the accompanying drawings.

THE SEVERAL VIEWS OF THE DRAWINGS

FIG. 1 is a greatly enlarged fragmentary vertical sectional view of a traffic carrying sign material wherein a number of improved systems of the invention are embedded; for better visualization of the arrangement, and of the actual behaviour of the systems, the unevenness of the surface is greatly exaggerated, and the illustration appears to be greatly contracted (except as to the systems, shown in side view) in its horizontal dimension;

FIG. 2 is a greatly enlarged diagrammatical and fragmentary view of the marked surface, seen in the direction in which grazing light, emitted by a vehicle headlamp at a distance of about 50 to 100 meters impinges thereupon.

Conclusively, the above FIGS. 1 and 2 illustrate the actual conditions under which a traffic regulating sign, such as a lane dividing line on a road surface, is illuminated by a vehicle headlamp and respectively is seen at a distance by the vehicle's driver.

FIGS. 6 and 7 are fragmentary and enlarged sectional views of two arrangements of the reflex reflecting system;

FIG. 8 is a graph including a plurality of curves showing the variation of the total transparency parameter with angle of incidence; and FIG. 9 is a graph wherein the most interesting part of the graph of FIG. 8 is shown in greatly enlarged and detailed manner.

DETAILED DESCRIPTION OF THE PREFERRED EMBODIMENTS

Figure 1:
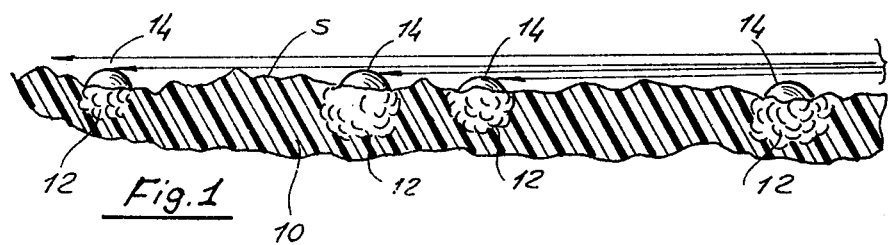

Referring first to FIG. 1, there is indicated at 10 the upper portion of a traffic carrying surface-forming composition, the surface S of which forms also the sign (such as a traffic lane dividing line) to which the desired nighttime visibility is imparted by embedding within such composition a suitable number (for surface area unity) of reflex reflecting systems 12, each having an exposed part-spherical portion 14 bulging upwardly of said surface S which, generally speaking, might be considered essentially planar and horizontal. The composition 10 forms no part of the invention, and since it is well known in this field, it will not be described, although it should be capable of firmly retaining the systems 12 when these are deeply enough embedded thereinto, say for more than half and even two-thirds of their diameters. The composition may be laid and doctored on the ground or applied thereon as a paint. In addition other procedures, well known in the art, can be made use of for forming the sign or marking. The systems can be dropped on the not yet set composition. Preferably but not necessarily the arrangement is formed by applying on and adhesively securing a suitable tape material to a suitably prepared road surface, said systems 12 having been preliminarily embedded in the tape composition. Compositions which are suitable for forming such tape materials have been desribed for example in my prior U.S. Pat. No. 3,587,415 and a preferred mode for forming a tape material having heterogeneous components (such as reflective systems) secured therein has been described in my Canadian Pat. No. 929,696 and in my prior U.S. Pat. aplication Ser. No. 153,218, filed June 15, 1791 (Now U.S. Pat. No. 3,782,843).

In FIG. 1 a number of rays of grazing light are diagrammmatically indicated by means of elongated arrows. Such rays are supposed to be at a very small inclination relative to the plane generally defined by the surface S. As a matter of fact, light rays emitted by the headlamps of a conventional vehicle and impinging on portions 14, form angles of 0°30' to 0°40' when such portions are about 100 meters ahead of the vehicle. A substantial total brilliancy of the sign or mark is greatly desirable in order to have the sign visible at such a safe distance.

Figure 2:
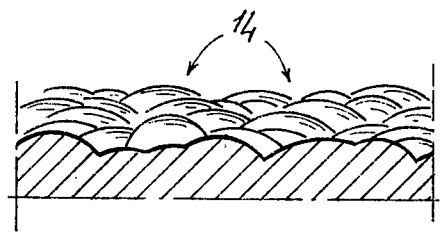

In such quite actual condition, the portions 14 can generally be impinged upon and "seen" at their very tips. A greatly magnified picture of such portions 14, as actually seen by a vehicle's driver, is shown in FIG. 2. Even if the exposed portions of the systems actually bulge out above the surface S for one third of the systems' diameter, the actually usable portion, because of the unavoidable unevenness of the neighbouring surface, the overlapping of the protrusions and so on, corresponds, statistically, from 10 to 20% of said diameter, from the point of view of grazing light impingement and collimated reflection, and even less at greater distances. FIG. 2 provides a diagrammatical but fairly trustworthy picture of this situation.

Figure 4:
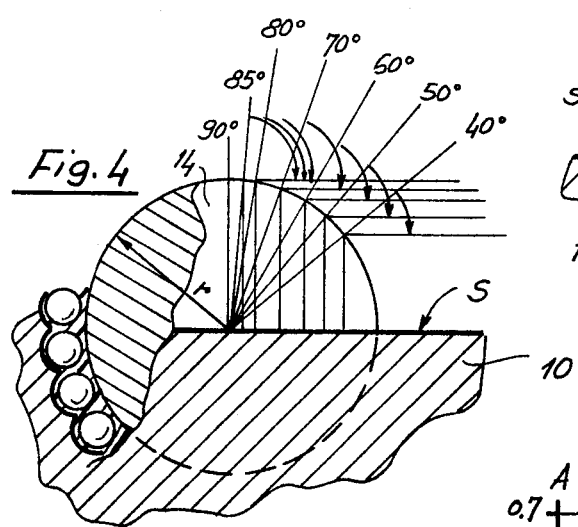
FIGS. 3 and 4 illustrate, in greatly enlarged scale in diagrammatical manner, the spherical lens, together with certain planes, levels and angles for making evident some criticalities upon which the invention is based.
Figure 3:
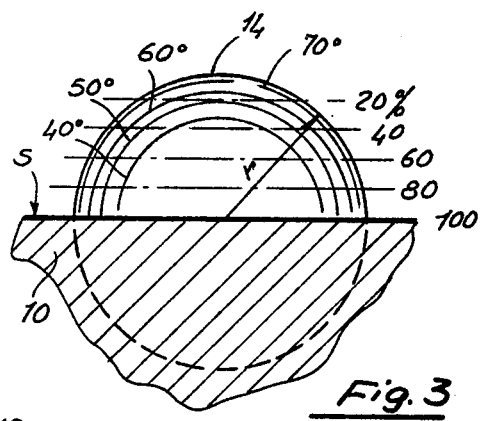

FIGS. 3 and 4 visualize a first and purely geometrical consequence of a partial exposure of a spherical surface, such as that of the part-spherical bulging out of protrusions 14. In FIG. 3 a portion 14, bulging out from a surface S by an amount equal to its radius $r$ is shown as severed by a plurality of horizontal lines referring to percentages values 20, 40 % and so on, defining the part of the bulge which is taken away for a corresponding percentage reduction of the radius $r$. A half-sphere bulging out (100 % $r$) will expose, to a grazing light beam, that is in a plane perpendicular to the light direction, an "useful" area A corresponding to that of a semicircle of radius $r$. FIG. 3 further comprises a plurality of semicircles, also referred to by the same percentage values, defining the useful areas which correspond to the indicated bulge.

FIG. 4 shows the angles formed by several light rays impinging on the sphere at various levels corresponding to the above bulge, with a plane tangent to the impinged location. The indicated angles are therefore the relative angles of incidence. It is known from optics that a ray of light, when passing from a first to a second transparent means of differing density, and which impinges at the interface under an angle of incidence different from 0°, is deviated and only partially passes into the second means, the remaining part being outwardly reflected and dissipated, as far as the scope of the invention and the field of the same invention are concerned. Grossly anticipating certain considerations discussed in more detail below, the dissipated amount of light is a function of both the angle of the incidence and the relative index of refraction of the two transparent means.

Evidently, a light ray impinging under an angle of incidence of 90° is not passed at all into the second means (actually, the partially exposed spherical lens).

Let us now assume that various spherical lenses having different indexes of refraction are available, and that such lenses can refract thereinto an useful amount of impinging light, only if the light impinges on their spherical surface under an angle of incidence equal to or less than 90° (purely theoretical) and respectively 80°, 70° and 60°. The curves of the graph of FIG. 5 indicate the actual value of the area, referred to the area A of the semicircle of radius $r$, for various percentage values of bulging out (%$r$). It is evident that the more the sphere can usefully refract light which impinges under higher angles of incidence, the greater is the useful area, that is the greater is the amount of light which can be refracted so as to then be reflex reflected and returned for providing the desired brilliancy.

But, considering an actual situation as depicted in FIGS. 1 and 2, that is the actual availability of bulges of less than 20 % r and principally than 10 % r the most interesting part of the graph is that at the left. There is seen, for example, that for a bulging out of 10 % r no refraction occurs at all in the sphere into which no noticeable amount of light can be refracted, when the light impinges at angles greater than 60°, and that in a lens which can refract light impinging at 70° or less, only a very marginal areal portion can be considered as useful for light refraction and retrocollimation.

Having thus considered certain essential premises of the invention, which premises provide also an explanation for certin aspects of the unexpected and important advantages of the same invention, let us now consider that the reflex reflecting systems most adapted to be improved according to the same invention can be embodied by structures of the type shown (diagrammatically) in FIG. 6 and respectively in FIG. 7. Such structures and the reflective aggregates comprising such structures have been described in detail in my French Pat. No. 2,086,257. Therefore, such structures will be now very briefly described.

The embodiment of FIG. 6 has a spherical lens which, when the system is in its service condition (see FIG. 1) has an exposed part-spherical surface 114 and a coating of transparent binder 16 thereabout, where not exposed. A plurality of beads 18 (only one is shown) are embedded in said layer and are provided with a reflective coating. The system is so arranged that a light beam R, impinging on the surface 114 under a given angle of incidence $i$ is in part outwardly reflected and dissipated (as indicated at R') and in part refracted into the lens, as indicated at R'', and then focused on a bead 18, where it is further focused and retrocollimated by the reflective concave surface and then returned along its own incident path.

The ray of light therefore undergoes several passages from one to a different transparent means: that is (1) from air to the lens, (2) from the lens to the binder, (3) from the binder to the bead, and then (4, 5 and 6) while returned into the air towards the source of light, various passages involving phenomena of partial reflection and dissipation, proportional to the various angles of incidence at the interfaces and to the relative indexes of refraction.

The embodiment of FIG. 7 differs from that of FIG. 6 in that the second focusing is provided by the same reflecting means itself, which in this ocurrene consists of a plurality of convex part-spherical reflective surfaces 20 (only one shown) adjacent to the transparent binder 16. The ray which travels into, through and out of the system undergoes, in this embodiment, only four passages from one to another means of different density or nature.

Such known systems require, for proper retrocollimation of the light rays, that they posses to certain characteristics. A spherical lens is capable of properly focusing a beam of impinging light only if made of a transparent glass (or other material) having an index of refraction of about 1.91 (relative to the air). The other transparent components must be made of materials having still higher indexes of refraction, particularly the retrocollimating beads, for providing the most desirable index of refraction, relative to the adjacent means, principally the spherical lens. If materials having indexes of refraction substantially lower than the optically and properly calculated ones are used, undesirable phenomena of improper focalization and of light scattering occur.

Now, while such properly calculated, arranged and manufactured systems operate satisfactorily when having ample spherical surfaces exposed to impinging light, and when the light actually impinges thereon under substantially low angles of incidence, the use of such systems for improving nighttime visibility of traffic carrying surfaces has in most occurrences, proven unsuccessful during actual service on the road. On the other hand, reflex reflecting systems comprising spherical lenses of relatively low index of refraction (usually indicated by the expression "$n_D$" in the optical art) and connected with reflex reflecting means (FIG. 6) or with purely reflective means (FIG. 7) by a transparent binder of index of refraction substantially equal to that of the lens, have unexpectedly provided a sharply improved nighttime visibiity, under grazing light, notwithstanding the poorer ability to properly focus and retrocollimate the impinging light.

The reasons for such improvement have been investigated and have been found in a critical combination of (a) the ability to refract within the sphere light rays impinging on its exposed portion under an angle of incidence $i$ greater than 80°, and (b) a total transparency parameter of at least 0.2 under such angle of incidence, the said factors having been found to be a great deal more important than those leading to a precise focalization and retrocollimation, as provided by more optically sophisticated structures, such as those provided by applying the current trend of the art.

The total transparency parameter, termed $T$ hereinafter, is the value given by the expression $$T = \frac{\text{transmitted light}}{\text{impinging light}}$$

and takes into account any light dissipation or, loss both external and internal, in the system, that is all passages through any interface. In the following discussion of the phenomena which contribute to attain the total transparency T, the angle of incidence $i$ at the interface of binder 16 to beads 18, in the embodiment of FIG. 6, has been assumed to be higher than the mean value of 70°. Further, the curves of the graphs of FIGS. 8 and 9, even being though not completely quantitative, have been carefully plotted and take also into account the transparency losses resulting from unavoidable collateral phenomena, such as of light polarization resulting from interface passage.

In view of the reasons which will be apparent below, various indexes $n_D$ of 1.9, of 1.5 and 1.3 will be considered. Such indexes are important: a $n_D$ of 1.9 is that of high refractive index glasses, of which properly focusing spherical lenses are made, the focus being on the surface of the sphere, opposite to the part-spherical portion thereof impinged by a beam of parallel rays; a $n_D$ of 1.5 is that of common "window-glasses", largely available and possessing the most desirable resistance to mechanical stresses, corrosion and wear, and it is also that of the most commonly adopted resinous binders made use of in providing the prior art reflex reflecting systems; the value of 1.3 for $n_D$ is fairly representative of the relative refractive index between a transparent binder of $n_D$ about equal to 1.5 and a sphere or a bead of $n_D$ about equal to 1.9, such as the beads 18 of the structure of FIG. 6, wherein a proper focalization is obtained on the reflective external coating of such beads.

The graphs of FIGS. 8 and 9 comprise various families of curves; all curves indicate the total transparency parameter T of various individual or plural systems, versus the minimum angle of incidence $i$ under which a beam of parallel rays inpinges on the exposed portion of a sphere, taking into account the above factors. All curves tend to zero for $i = 90°$.

The curves $T_{1.9}$, $T_{1.5}$ and $T_{1.3}$ indicate the transparency T for R'' within the sperical lens of either the FIG. 6 or FIG. 7 structures. Such curves indicate only the ratio between the usefully refracted ray at R'' and the dissipated reflected ray at R'. On the other hand, such curves are immaterial because at least two interface passages "air-to-lens" and "lens-to-air" occur for returning the light and, therefore, the value of significance is given by the second power of these transparency values, such as shown by curves $T_{1.9}^2$, $T_{1.5}^2$ and $T_{1.3}^2$.

The curve $T_{1.5}^2$ is representative of the total transparency of a system such as that of FIG. 7 and consisting, according to the invention, of a lens made of a common glass of $n_D$ about equal to 1.5, of a binder of nearly equal $n_D$ (the relative "glass-binder" $n_D$ being about 1, and thus not affecting the transparency) and of specular reflective surfaces such as indicated at 20, and which also do not affect the transparency.

Considering now a structure constructed such as that of FIG. 6 (of less transparency but providing a somewhat higher amount of returned light) this comprises, according to the invention, a lens of $n_D = 1.5$, a binder of $n_D$ about equal to 1.5 about also, and beads of $n_D = 1.9$, the curve representative of the total transparency of such improved system being that indicated at $T_{1.5}^2 \times T_{1.3}^2{}_{(i=70°)}$, which takes into account both the two passages across the interface "binder-bead" and the mean incidence angle at such interface, in both directions.

The sharp improvement of the invention is evident from a comparison of the above curves with those resulting from prior art systems, comprising a spherical lens of $n_D$ about equal to 1.9, a binder of $n_D$ about equal to 1.5, and beads, if any (the structure of FIG. 7) of $n_D$ about equal to 2.25 about. The curves representative of the total transparency of such prior art systems are those indicated at $T_{1.9}^2 \times T_{1.3}^2$ and respectively at $T_{1.9}^2 \times T_{1.3}^2 \times T_{1.5}^2{}_{(i=70°)}$.

Figure 5:
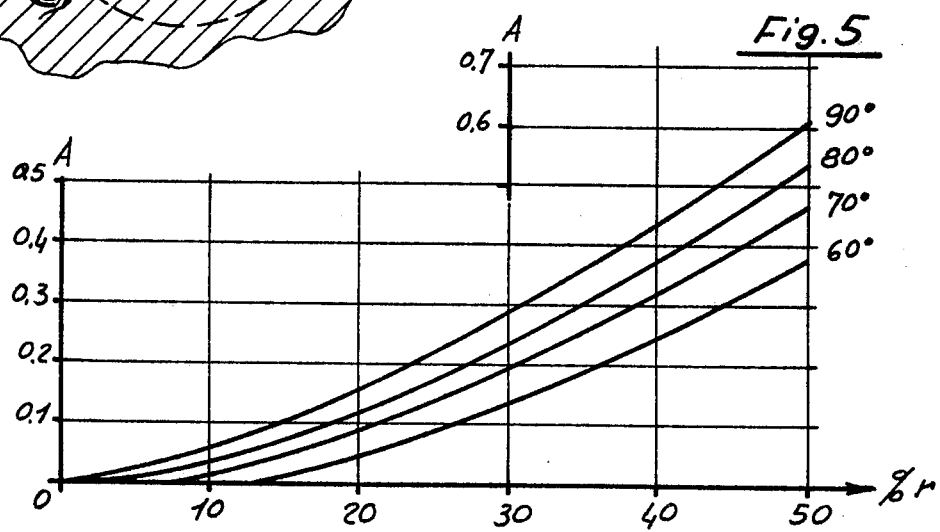
FIG. 5 is a graph wherein the actual useful exposed surface of the lens is plotted at various conditions of incidence and visibility.

Upon a reconsideration of that discussed above with reference to FIGS. 1 and 2 and the graph of FIG. 5, it is evident that, in the actual service of such systems on a sign formed upon a traffic carrying road surface, the actually useful bulging out of the exposed portions of the spheres is not more than 20 percent of the radius of the same spheres, and sometimes 15 percent only, meaning that the grazing light cannot actually impinge (as a mean value) on said exposed portions under an angle of $i$ less than 80°, or even more.

The large scale partial graph of FIG. 9 evidences the sharp transparency improvement. Even when i is not greater than 80°, a total transparency increase of more than two and one-half times is obtained, and 7 times as opposed to conventional beaded systems. At the most important angle $i$ of 85°, the mean improvement is of the order of seven times, the beaded improved structure represented by curve $T^2_{1.5} \times T^2_{1.3(i=70°)}$ providing still a substantial optical response at $i = 85°$, while the conventional structures do not.

The respective values might be also compared by a consideration of the following Table, wherein the total transparency, for structures according to FIG. 7 and FIG. 6, is considered both for the improved form and the conventional form. The Table includes also the ratios between respective total transparencies, that is numerical indications of the improvement, said ratios being adjusted by taking into account minor adjustments.

TABLE

|  | $i = 80°$ | | $i = 85°$ | |
|---|---|---|---|---|
|  | T | ratio | T | ratio |
| System of FIG. 7 | | | | |
| (invention) | | | | |
| $T^2_{1.5}$ | 0.3744 | 2.58 | 0.1499 | 6.12 |
| (prior art) | | | | |
| $T^2_{1.9} \times T^2_{1.3}$ | 0.1468 | | 0.0248 | |
| System of FIG. 6 | | | | |
| (invention) | | | | |
| $T^2_{1.5} \times T^2_{1.3(i=70°)}$ | 0.2771 | 2.68 | 0.1109 | 6.56 |
| (prior art) | | | | |
| $T^2_{1.9} \times T^2_{1.3} \times T^2_{1.5(i=70°)}$ | 0.1008 | | 0.0170 | |

In the actual use of the above described systems and materials the advantages provided by the improvement of the invention are a great deal more important than what appears from a plain consideration of the above numerical values and the accompanying graphs. It is to be taken into account that such systems are generally embodied into small spherical bodies of one millimeter diameter or so, and are generally more or less evenly distributed on the entire surface of the traffic carrying marking or sign, to provide a myriad of brilliant "spots" thereon, when impinged by light.

On the other hand, the amount of light returned towards the eyes of the driver of the vehicle the headlamps of which provide the illumination is actually of the order of thousandths of the emitted light. The systems provide, at distance and under grazing light, a very faint luminescence to the thus reflectively illuminated sign. The perceptibility at distance of the sign is simply limited by the threshold of the human eye vision. Now, to provide a sign or marking which can be perceived say 20 or 30 percent further away than a conventional one means a sharp improvement in traffic safety. This improvement is of paramount importance when the traffic requires switching on the passing beam, where a delayed perceiving of a sign signalling the approach a road section where overtaking is prohibited, or to a curve signalled by a traffic separating or road boundary marking line, might lead to an emergency or even a crash.

A highly transparent system improved according to the invention cannot provide an exact and directional return of the light towards its source. It has been found that this limitation is unexectedly rather unimportant when compared with the importance of the amount of the returned light ensured by the high total transparency. Some light scattering does not substantially affect the preceiving of the sign, as a whole, and it is also useful. For example, the sign illuminated by the lamps, switched on passing beam, of a slower vehicle, are neatly perceived at a greater distance by the driver of a faster vehicle which is approaching to overtake the slower one, so that said driver can perceive at a safer distance the warning signs, if any, indicating for example that a road intersection or other situation is being approached, so that the overtaking can be aborted in good time, for example.

I claim:

1. A marked road, comprising a roadway pavement; and a traffic-regulating indicium provided on said pavement and including a layer of material having an upwardly facing surface the entire extent of which is approximately planar, said indicium further including reflective aggregates partially embedded in said layer, and at least one of said aggregates comprising a substantially spherical transparent element having an exposed portion projecting upwardly of said surface and another portion projecting downwardly from said surface into said layer, said element having an index of refraction such that rays impinging said exposed portion at large angles of incidence are at least partially refracted into said element, and said one aggregate further comprising a transparent binder substance contacting said other portion of said element, and reflecting means for the reflection of rays refracted into said element associated with said other portion of said element and spaced from the same by said binder substance, said binder substance having an index of refraction which approximately equals that of said element so that the reflex reflextivity of said one aggregate is reduced from that of similar units wherein the index of refraction of the spherical lens exceeds that of the binder while the total transparency parameter of said one aggregate is substantially increased over that of said similar units.

2. A road as defined in claim 1, wherein the index of refraction of said element is between about 1.3 and 1.7.

3. A road as defined in claim 2, wherein said element comprises glass having an index of refraction of about 1.5.

4. A road as defined in claim 1, wherein the total transparency parameter of said one aggregate is a minimum of about 0.2 for light rays impinging said exposed portion at angles of incidence up to about 80°.

5. A road as defined in claim 4, wherein the index of refraction of said element is between about 1.3 and 1.7.

6. A road as defined in claim 1, wherein said reflecting means comprises reflective surfaces which are convex in relation to said other portion of said element.

7. A road as defined in claim 6, said element and said binder substance each having an index of refraction of about 1.5; and wherein the total transparency parameter of said one aggregate is a minimum of about 0.3 for light rays impinging said exposed portion at angles of incidence up to about 80°.

8. A road as defined in claim 1, wherein said reflecting means comprises transparent beads having part-spherical surfaces facing away from said other portion of said element, and a reflective coating provided over said part-spherical surface.

9. A road as defined in claim 8, wherein the ratio of the index of refraction of said beads to that of said binder is a maximum of about 1.3.

10. A road as defined in claim 9, said beads comprising glass having an index of refraction of about 1.9; and wherein the total transparency parameter of said one aggregate is a minimum of about 0.25 for light rays impinging said exposed portion at angles of incidence up to about 80°.

11. A road as defined in claim 1, wherein said surface of said layer is reflective.

12. A reflective aggregate, comrpsing a substantially spherical transparent element adapted to have a portion exposed for impingement by rays, said element having an index of refraction such that rays impinging the same at large angles or incidence are at least partially refracted into said element; reflecting means for the reflection of rays refracted into said element; and a transparent binder substance securing said reflecting means to said element and spacing said reflecting means from said element, said binder substance having an index of refraction which approximately equals that of said element so that the reflex reflectivity of said aggregate is reduced from that of similar units wherein the index of refraction of the spherical lens exceeds that of the binder while the total transparency parameter of said aggregate is substantially increased over that of said similar units.

13. An aggregate as defined in claim 12, wherein the index of refraction of said element is between about 1.3 and 1.7.

14. An aggregate as defined in claim 12, wherein the total transparency parameter of said aggregate is a minimum of about 0.2 for light rays impinging said element at angles of incidence up to about 80°.

* * * * *